Aug. 30, 1966 D. J. LEMENS 3,270,246
SHUNT CAPACITOR BANK
Filed Jan. 11, 1963 3 Sheets-Sheet 1
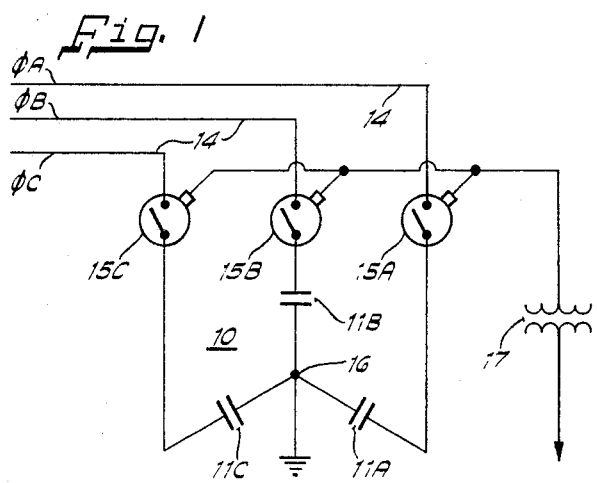
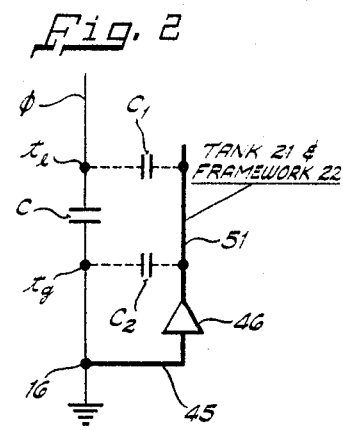
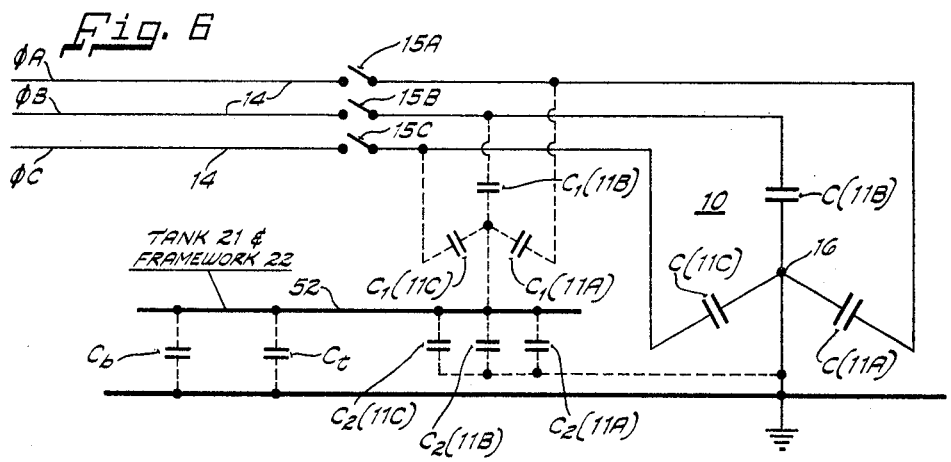
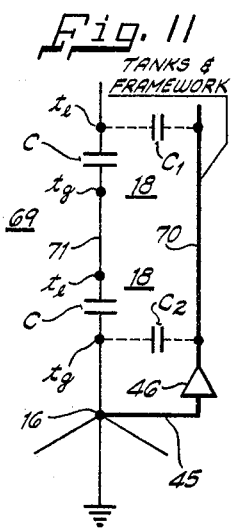
INVENTOR.
DONALD J. LEMENS
BY Lee H Kaiser
ATTORNEY Aug. 30, 1966 D. J. LEMENS 3,270,246
SHUNT CAPACITOR BANK
Filed Jan. 11, 1963 3 Sheets-Sheet 2

INVENTOR.
DONALD J. LEMENS
BY Lee H Kaiser
ATTORNEY

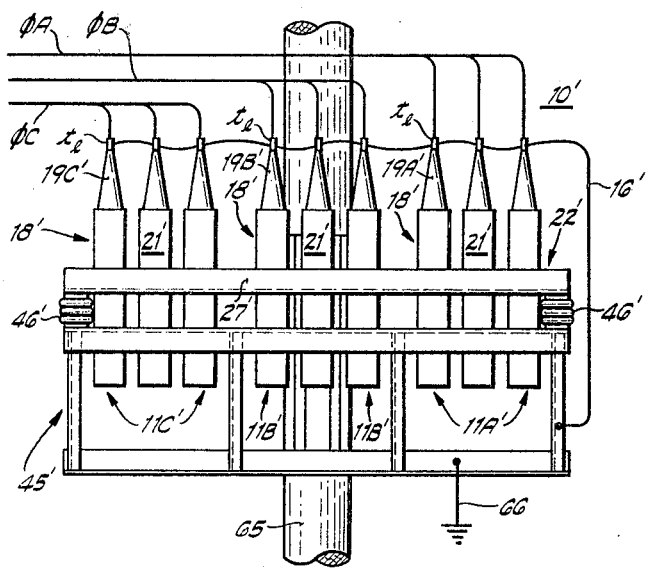
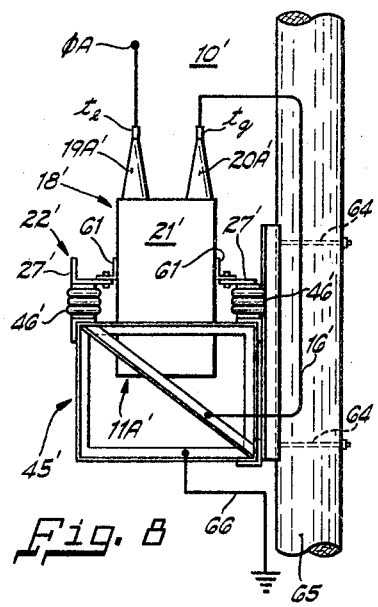
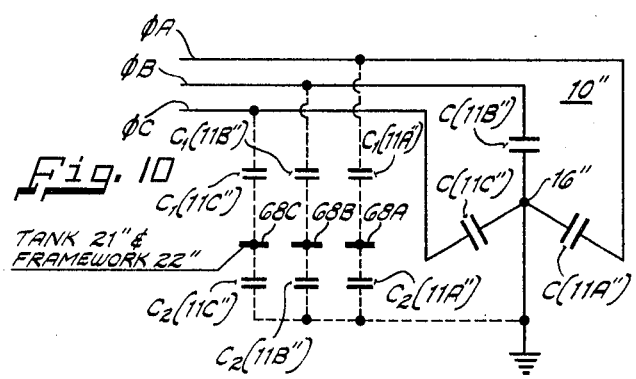
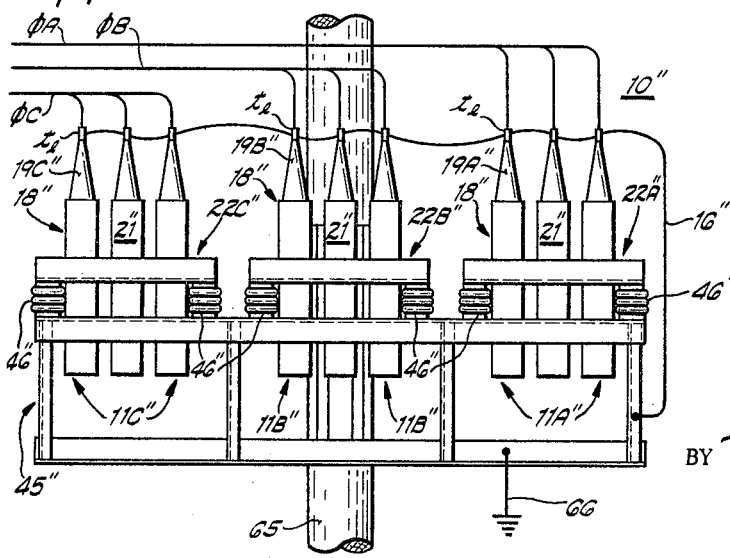
INVENTOR.
DONALD J. LEMENS
BY Lee H Kaiser
ATTORNEY

United States Patent Office 3,270,246
Patented August 30, 1966

3,270,246
SHUNT CAPACITOR BANK
Donald J. Lemens, South Milwaukee, Wis., assignor to McGraw-Edison Company, Milwaukee, Wis., a corporation of Delaware
Filed Jan. 11, 1963, Ser. No. 250,818
16 Claims. (Cl. 317—12)

This invention relates to shunt capacitor banks for supplying reactive volt amperes to an alternating current power system and in particular to shunt capacitor banks capable of withstanding high surge voltages.

The standards of the National Electrical Manufacturing Association require that power capacitors be capable of withstanding an impulse test with a 1.5×40 microsecond positive full wave at not less than a predetermined voltage for each voltage rating of capacitor, e.g., a wave with a 95 kilovolt crest for capacitors having a voltage rating of between 5001 and 15,000 volts. The test is made by applying the impulse voltage between the capacitor terminals, connected together, and the housing, or tank.

The voltage of electric power distribution systems is being steadily increased by electric utilities, and a need exists for power system apparatus capable of withstanding a 1.5×40 microsecond positive full wave at not less than 125 kilovolt crest voltage, i.e., having a basic impulse insulation level (abbreviated BIL) of 125 kilovolts. Conventionally, capacitors of 12.5 to 14.4 kilovolt rating are manufactured to have a 95 kilovolt BIL. Shunt capacitor banks usually have two bushing capacitor units supported on a grounded metallic frame or single bushing units mounted on a metallic frame which is insulated from ground and constitutes the floating neutral of the capacitor bank.

Many electric utilities will not utilize floating Y capacitor banks on feeders because of the possibility of ferroresonance and phase reversal resulting from feedback through the capacitor bank in the event one phase is opened on the source side of the capacitor bank. Some manufacturers construct power capacitors with a BIL of 125 kilovolts, but such capacitors are much more expensive than units of comparable kvar. having 95 kilovolt BIL rating.

It is an object of the invention to provide a capacitor bank having a higher impulse insulation level than prior art banks.

It is a further object of the invention to provide a capacitor bank wherein capacitors can be utilized having an impulse insulation level lower than that of the power system to which the bank is connected.

It is a still further object of the invention to provide a grounded neutral Y capacitor bank of 95 kilovolt BIL capacitors which can be utilized on a 125 kilovolt BIL power system.

These and other objects and advantages of the invention will be more readily apparent from the following detailed description when taken in conjunction with the accompanying drawing wherein:

FIG. 1 is a circuit diagram of a capacitor bank embodying the invention;

FIG. 2 is a schematic diagram illustrating the capacitance parameters in a single capacitor of the bank of FIG. 1;

FIG. 6 is a schematic circuit diagram illustrating the capacitance parameters in the capacitor bank of FIGS. 1 and 3–5;

FIGS. 7 and 8 are front and end views respectively of a pole-mounted capacitor bank embodying the invention;

FIG. 9 is a front view of a pole mounted capacitor bank embodying the invention and having a higher impulse insulation level than that of the capacitor bank of FIGS. 7 and 8;

FIG. 10 is a schematic circuit diagram of the capacitance parameters in the bank of FIG. 9; and FIGS. 11, 12 and 13 are schematic circuit diagrams of the capacitance parameters in capacitor banks in accordance with the invention having two series groups.

Referring to FIG. 1, a capacitor bank 10 of three capacitors 11A, 11B, and 11C is adapted to be connected in Y to a three phase power system 14 comprising phase conductors $\phi_A$, $\phi_B$, and $\phi_C$ when switches 15A, 15B and 15C are operated. The neutral 16 of capacitor bank 10 is grounded. Signals for simultaneously actuating the switches 15A, 15B, and 15C from a remote location may be supplied through a 1-to-1 ratio isolating transformer 17 in the manner disclosed in U.S. Patent 2,887,647 to Strozier, having the same assignee as the present invention. The switches 15A, 15B and 15C may be of the type disclosed in U.S. Patent 2,671,141 to W. J. Weinfurt having the same assignee as the present invention, and the isolating transformer 17 may be eliminated if switches 15A, 15B and 15C of 125 kilovolt BIL are mounted on a grounded framework.

Figure 3:
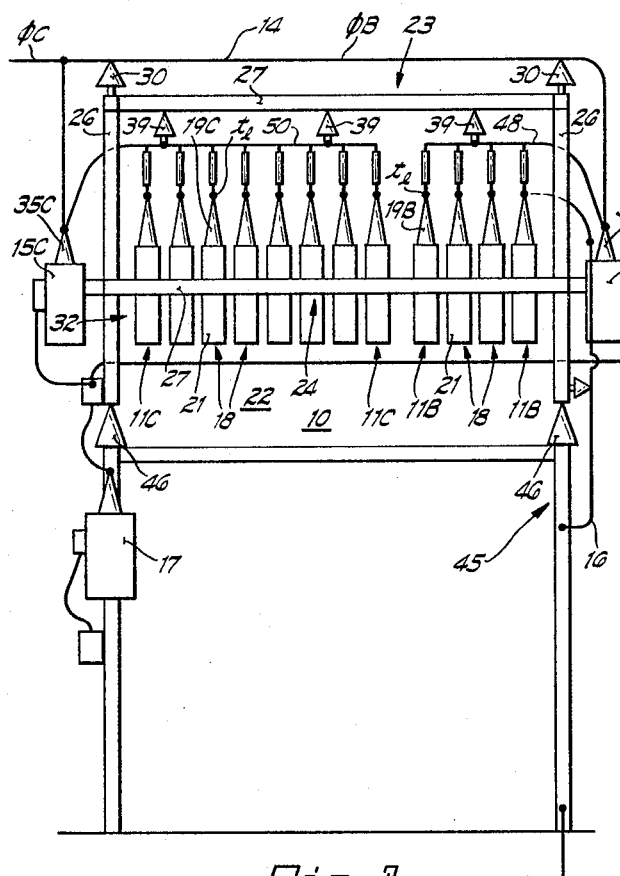
FIGS. 3, 4 and 5 are front, plan, and left end views respectively of a capacitor bank connected in accordance with the circuit diagram of FIG. 1.
Figure 5:
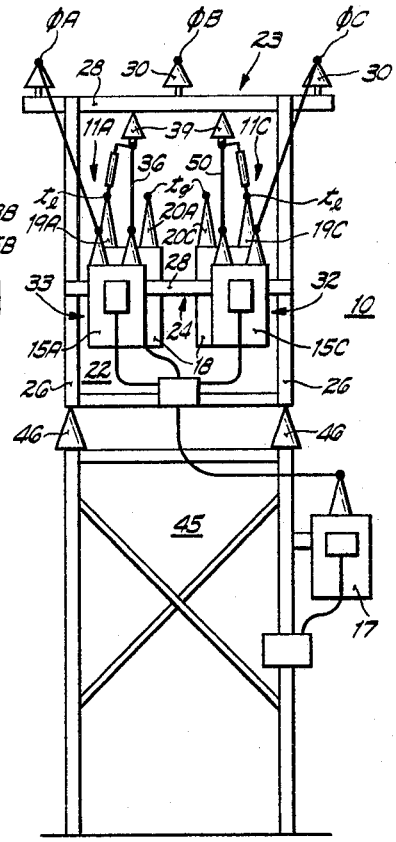
Figure 4:
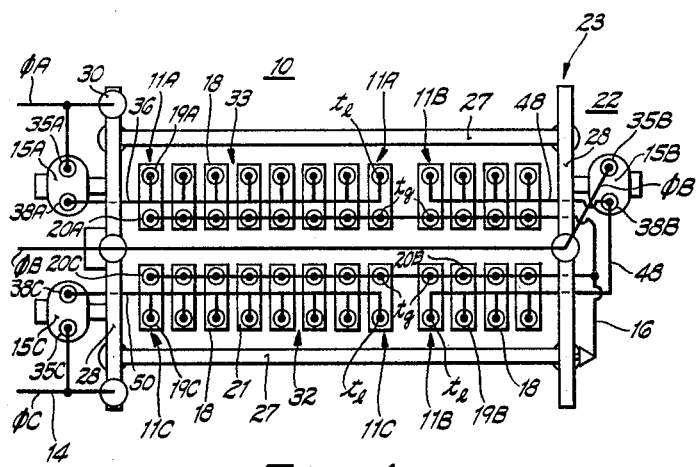

As shown in FIGS. 3–5, each capacitor 11A, 11B, and 11C of bank 10 may comprise eight conventional two bushing capacitor units 18, preferably of 95 kilovolt BIL rating, connected in parallel between one phase conductor of the power system 14 and the neutral 16. Each capacitor unit 18 has a plurality of capacitor packs, or sections (not shown), enclosed within a metallic housing, or tank, 21 and connected to conductor studs (not shown) which extend axially through a pair of insulating bushings 19 and 20 on housing 21. The conductor studs through insulating bushings 19 and 20 terminate respectively in a line terminal $t_1$ and a ground terminal $t_g$. The housings 21 of the capacitor units 28 are mounted (by means not shown) on a floating metallic framework 22 electrically insulated from ground. Framework 22 includes upper and lower levels 23 and 24 respectively connected at their ends by means such as welding to vertical metallic corner posts 26 which are preferably of angle iron. Upper and lower levels 23 and 24 include front and rear longitudinal horizontal members 27, preferably of angle iron, connected at their ends by means such as welding to posts 26 and to laterally extending, horizontal, metallic end members 28 which also are preferably of angle iron. The power line phase conductors $\phi A$, $\phi B$, and $\phi C$ are supported on insulators 30 mounted on the end members 28 of the upper level 23.

As best seen in FIG. 4, the twenty-four capacitor units 18 in bank 10 are arranged in front and back rows 32 and 33 respectively of aligned capacitor units 18 supported (by means not shown) on the front and rear longitudinal members 27 of lower level 24. The paralleled capacitor units 18 which comprise capacitor 11A and are connected through individual fuses to phase conductor $\phi A$ are positioned at the left end of back row 33. Switch 15A for energizing capacitor 11A is mounted on the angle iron end member 28 at the left end of lower level 24. Phase conductor $\phi A$ is connected to the terminal on one insulating bushing 35A of switch 15A. A conductor 36 connected to the terminal on the second insulating bushing 38A of switch 15A is supported by insulators 39 depending from longitudinal members 27 of upper level 23 and is also connected through individual fuses to the line terminal $t_1$ on the outer insulating bushing 19A of each of the eight capacitor units 18 which comprise capacitor 11A and are positioned at the left end of rear row 33. The ground terminal $t_g$ on the inner insulating bushing 20A of all capacitor units 18 of capacitor 11A is connected to neutral conductor 16 which, in turn, is electrically connected to a grounded metallic base framework 45 which rests upon the ground and supports framework 22. The floating metallic framework 22 which supports the capacitor units 18 is isolated from the grounded base framework 45 by insulators 46.

The eight capacitor units 18 which comprise capacitor 11B and are connected to phase conductor $\phi_B$ are supported on lower level 24 and disposed at the right end of rows 32 and 33. Switch 15B for connecting the capacitor units 18 of capacitor 11B to phase conductor $\phi_B$ is mounted on the horizontal end member 28 at the right end of lower level 24. Phase conductor $\phi_B$ is connected to the terminal on one insulating bushing 35B of switch 15B. Conductors 48 supported on insulators 39 depending from horizontal members 27 of upper level 23 are connected to the terminal on the other insulating bushing 38B of switch 15B and also connected through individual fuses to the line terminal $t_1$ on the outer insulating bushings 19B of the eight capacitor units at the right end of rows 32 and 33. The ground terminals $t_g$ on the inner insulating bushings 20B of these eight capacitor units 18 are electrically connected to grounded neutral conductor 16.

The eight capacitor units 18 which comprise capacitor 11C and are connected to phase conductor $\phi_C$ are supported on lower level 24 and disposed at the left end of front row 32. Switch 15C for connecting the capacitor units 18 of capacitor 11C to phase conductor $\phi_C$ is mounted on horizontal angle iron end member 28 at the left end of lower level 24. Phase conductor $\phi_C$ is connected to the terminal on one insulating bushing 35C on switch 15C. The terminal on the other insulating bushing 38C of switch 15C is connected by wire 50 supported on depending insulators 39 and through individual fuses to the terminal $t_1$ on the outer insulating bushings 19C of the eight capacitor units 18 at the left end of the front row 32 which comprise capacitor 11C. The ground terminals $t_g$ on the inner insulating bushings 20C of the capacitor units 18 of capacitor 11C are connected to the neutral conductor 16.

Isolator transformer 17 is mounted on the grounded base framework 45.

FIG. 2 schematically illustrates the lumped capacitance parameters of each capacitor 11, or of each capacitor unit 18, of capacitor bank 10, the symbols representing the following:

C—terminal-to-terminal capacitance of capacitor, e.g., between terminals $t_1$ and $t_g$.

$C_1$—line terminal-to-tank capacitance of capacitor, e.g., between terminal $t_1$ on bushing 19 and tank 21.

$C_2$—grounded terminal-to-tank capacitance of capacitor, e.g., between terminal $t_g$ on bushing 20 and tank 21.

A typical terminal-to-tank capacitance $C_1$ or $C_2$ of a conventional 50 kilovar unit 18 is approximately 2000 micro-microfarads. Conventional capacitor units 18 are manufactured to have an impulse insulation level, i.e., BIL, of 95 kilovolts for terminal-to-tank capacitances $C_1$ and $C_2$. Inasmuch as the terminal-to-terminal breakdown path is through the insulation of two bushings, the terminal-to-terminal capacitance C of a conventional capacitor unit 18 can withstand a much higher impulse voltage without failure than the terminal-to-tank capacitance $C_1$ or $C_2$ and its BIL approaches twice the 95 kilovolt BIL of the terminal-to-tank capacitance $C_1$ or $C_2$.

In the usual shunt capacitor bank wherein two-bushing units are supported on a grounded metallic frame or single-bushing units are mounted on a floating metal frame, the impulse insulation level of the terminal-to-tank capacitances $C_1$ and $C_2$ limits the impulse insulation level of the power system on which the capacitor bank can be utilized. Capacitor banks in accordance with the invention can be utilized on power systems having an impulse insulation level higher than the BIL of the terminal-to-tank capacitances $C_1$ and $C_2$ of the capacitor units 18. For example, capacitor units having terminal-to-tank capacitances $C_1$ and $C_2$ of 95 kilovolt BIL may be utilized on power systems having a 125 kilovolt and higher BIL.

The heavy line 51 in FIG. 2 schematically represents the capacitor unit housings 21 electrically commoned with the supporting framework 22 and isolated from ground by the base insulators 46 disposed between framework 22 and grounded metallic framework 45. Surge voltage appearing on a conductor $\phi$ of power line 14 will have two paths to ground. One path is through the terminal-to-terminal capacitance C which has a very high BIL. The other path for the surge is through the line terminal-to-tank capacitance $C_1$ to the tank 21 and then from the tank 21 through ground terminal-to-tank capacitance $C_2$ to ground. Thus, a surge voltage will divide across the terminal-to-tank capacitances $C_1$ and $C_2$ each of which has a BIL of 95 kilovolt. Consequently, the BIL of the capacitor unit 18 arranged as illustrated in FIG. 2 is theoretically double that of a two-bushing unit mounted in the usual manner on a grounded metallic framework or a single-bushing unit mounted on a floating metallic framework.

FIG. 6 schematically represents the lumped capacitance parameters of the capacitor bank 10 of FIGS. 1 and 3–5 (omitting the capacitances of the switches 15A, 15B and 15C). The terminal-to-terminal capacitances C of the capacitors 11A, 11B, and 11C are shown connected in Y. The line terminal-to-tank capacitances $C_1$ of the capacitors 11A, 11B, and 11C are shown connected in Y with the floating neutral of the Y depicted by the heavy line 52 which represents the electrically commoned tanks 21 and framework 22. The paralleled capacitances from electrically commoned framework 22 and tanks 21 to ground are shown as the capacitance $C_b$ of the base insulators 46, the distributed capacitance $C_t$ of the isolation transformer 17, and the tank-to-ground terminal capacitances $C_2$ of the capacitors 11A, 11B and 11C. Since the three paralleled tank-to-ground terminal capacitance $C_2$ are in series with the line terminal-to-tank capacitances $C_1$, approximately one-fourth of the surge voltage will appear across the tank-to-ground terminal capacitance $C_2$ and three-fourths of the surge voltage will appear across the line terminal-to-tank capacitance $C_1$. The effective BIL of capacitor bank 10 is thus greater than 125 kilovolts since only approximately 75 percent of a surge impulse of 125 kilovolt magnitude will appear across $C_1$ which has an impulse insulation level of 95 kilovolts. Actually, base insulator capacitance $C_b$ and isolator transformer capacitance $C_t$ are in parallel with tank-to-ground terminal capacitances $C_2$, and thus a slightly greater percent of the surge voltage will appear across line terminal-to-tank capacitance $C_1$, but the capacitances $C_b$ and $C_t$ are very small compared to the terminal-to-tank capacitances $C_1$ and $C_2$.

The schematic circuit diagram of FIG. 6 is also applicable to the pole mounted capacitor bank 10' of FIGS. 7 and 8, although the switches 15 are not shown in the latter. Elements of the bank of FIGS. 7 and 8 similar to those of the capacitor bank 10 of FIGS. 1 and 3–5 are given the same reference numerals with the addition of the prime (') designation. Each capacitor 11A', 11B' and 11C' comprises three capacitor units 18' connected in parallel, and the capacitors 11A', 11B' and 11C' are connected in Y. The housings 21' of the capacitor units 18' of all three phases are mounted by brackets 61 on a metallic framework 22' of elongated horizontal angle iron members 27'. The framework 22' is isolated by insulators 46' from a grounded supporting framework 45' of metallic angle iron members. Grounded framework 45' is affixed by through bolts 64 on a wooden power pole 65. The switches for connecting the capacitor bank 10' to and disconnecting it from power line 14 are not shown in FIGS. 7 and 8, and each of the phase conductors $\phi_A$, $\phi_B$, and $\phi_C$ is illustrated as connected to the line terminals $t_1$ on insulating bushing 19' of the three capacitor units 18' which comprise the capacitors 11A', 11B' and 11C' respectively. The ground terminals $t_g$ on the insulating bushings 20A', 20B' and 20C' of all nine capacitor units are connected to neutral conductor 16' which is connected to grounded supporting framework 45'. A ground conductor 66 connected to framework 45' is affixed to pole 65 and is connected (by means not shown) to a solid ground.

The capacitor bank 10' of FIG. 9 is also similar to that of FIGS. 1 and 3–5 and elements analagous thereto are given the same reference numerals with the addition of the double prime (″) designations. The tanks 21″ of the capacitors 11A″, 11B″ and 11C″ of each phase are mounted on and electrically commoned with separate metallic frameworks 22A″, 22B″ and 22C″. The floating frameworks 22A″, 22B″ and 22C″ are supported on insulators 46″ which isolate them from the supporting metallic framework 45″. FIG. 10 is the schematic circuit diagram of the capacitor bank 10″ of the embodiment of FIG. 9. The short heavy lines 68A, 68B and 68C schematically represent the floating metallic frameworks 22A″, 22B″ and 22C″ electrically commoned with the metallic tanks 21″ of the capacitors 11A″, 11B″ and 11C″ respectively. Since the ground terminal-to-tank capacitance $C_2$ of each capacitor 11A″, 11B″ and 11C″ is in series with the line terminal-to-tank capacitance $C_1$, the surge voltage will divide equally across the terminal-to-tank capacitances $C_1$ and $C_2$ and the effective BIL of the capacitor bank 10″ is twice that of the terminal-to-tank capacitances $C_1$ and $C_2$ or 190 kilovolts.

The invention is applicable to a capacitor bank of two series groups. For example, an electric utility may desire to convert a 7.2/12.5 kilovolt distribution system to a 14.4/24.9 kilovolt system and to utilize the 7200 kilovolt capacitor units already installed. The tanks of the paralleled capacitor units 18 of both series groups of a capacitor bank 69 are supported on a floating metallic framework isolated from ground by insulators 46 and represented schematically by the heavy line 70 in the schematic circuit diagram of FIG. 11. The ground terminals $t_g$ on the bushings 20 of the capacitor units 18 of one series group are connected by conductor 71 to the line terminal $t_1$ on bushings 19 of the capacitor units 18 of the second series group to connect the two groups (and thus the terminal-to-terminal capacitances C of the two groups) in series. The ground terminal-to-tank capacitance $C_2$ of the first series group and the line terminal to tank capacitance $C_1$ of the second series group are omitted to better illustrate the path to ground for the surge voltage. Half the surge voltage appears across the line terminal-to-tank capacitance $C_1$ of the first group and the remainder of the surge voltage appears across the tank-to-ground terminal capacitance $C_2$ of the second group with the result that the impulse insulation level of the two series group capacitor bank 69 is approximately twice the 95 kilovolt BIL of the terminal-to-tank capacitances $C_1$ and $C_2$.

In the two-series group capacitor bank 69 represented in FIG. 11, the tanks 21 of the capacitor units of all phases can be electrically commoned, as in the bank 10' of FIGS. 7 and 8, or the tanks 21 of each phase can be commoned and mounted on a metallic framework insulated from ground and also from the tanks and supporting frameworks of the other phases as in the capacitor bank of FIG. 9.

In the two-series group capacitor bank 79 schematically represented in FIG. 12, the tanks of the capacitor units 18 of one series group and the metallic framework 80 on which they are mounted are isolated by insulators 46 from ground and from the floating metallic framework 81 on which the capacitor units 18 of the second series groups is mounted. It will be appreciated that in this embodiment the series arrangement of terminal-to-tank capacitances $C_1$ and $C_2$ of each series group forms a path for the surge voltage in shunt to the terminal-to-terminal capacitance C of such series group and thus substantially increases the BIL in comparison to prior art arrangements.

The capacitor banks of FIGS. 9 and 12 with capacitor units of 95 kilovolt BIL can be utilized on a 20/34.5 kilovolt power distribution system having a 150 kilovolt impulse insulation level.

FIG. 13 schematically represents a two-series capacitor bank 85 wherein the tanks of the capacitor units 18 of both series groups are supported on a floating metallic framework 86 which is connected by a conductor 87 to the conductor 71 which joins the ground terminals $t_g$ on the bushings 20 of the capacitor units of one series group to the line terminal $t_1$ on the bushings 19 of the second series group. In this embodiment one terminal-to-tank capacitance of each series group forms a path for the surge voltage in shunt to the terminal-to-terminal capacitance C thereof, but inasmuch as the line terminal-to-tank capacitance $C_1$ of the first group is in series with the tank-to-ground terminal capacitance $C_2$ of the second group, the BIL of capacitor bank 85 is approximately double that of conventional banks wherein two bushing units are mounted on a common frame. It will also be noted that the capacitor units of the bank 85 of FIG. 13 can be single-bushing units since the series connection of the two capacitor units is made through the two electrically commoned tanks.

While only a few embodiments of the invention have been illustrated and described, many modifications and variations thereof will be readily apparent to those skilled in the art, and consequently, it is intended in the appended claims to cover all such modifications and variations which fall within the true spirit and scope of the invention.

I claim:

1. In combination with a three phase alternating current power line, a capacitor bank connected in Y to said power line and having a grounded neutral, said capacitor bank having a plurality of capacitor units connected between each phase of said power line and said grounded neutral, each said capacitor unit including a metallic housing, capacitor sections within said housing, a pair of insulating bushings on said housing, a conductor extending through each insulating bushing and connected to said capacitor sections within said housing, one of said conductors being connected to one phase of said power line and the other being connected to said grounded neutral, a plurality of means each of which is associated with one of said phases for electrically commoning the metallic housings of the capacitor units connected to said phase, and means for insulating said electrically commoned housings of said capacitor units connected to each of said phases from ground, whereby a surge voltage on any phase of said power line has a path to ground through the capacitance between said one conductor and said housing of each capacitor unit connected to said phase in series with the parallel arrangement of the capacitances between said housing and said other conductor of all of said units connected to said phase and the impulse insulation level of said capacitor bank is increased.

2. In the combination defined by claim 1 wherein said means for commoning electrically interconnects said metalling housings of the capacitor units connected to all three phases.

3. In a three phase shunt capacitor bank for supplying reactive volt amperes to a three phase electric power system and having a plurality of capacitor units associated with each phase and each capacitor unit is provided with a metal tank enclosing capacitor sections and having a pair of insulating bushings on said tank each of which has a conductor extending therethrough connected to said capacitor sections within said tank; the improvement comprising means for connecting one said conductor of all the capacitor units associated with each phase to ground and the other said conductor thereof to one phase of said power system, whereby said capacitor bank is connected in Y to said power system and the neutral is grounded, three metallic frameworks each of which supports and is electrically commoned with the tanks of the capacitor units in one of said phases, and three insulator means each of which isolates one of said frameworks from ground and from the other frameworks, whereby an impulse on any phase of said power system has a path to ground through the capacitance between said one conductor and said tank of each capacitor unit connected to said phase in series with the parallel arrangement of the capacitances between said housing and said other conductor of all said units connected to said phase and the impulse insulation level of said capacitor bank is increased.

4. In a three phase shunt capacitor bank for supplying reactive volt amperes to a three phase electric power system and having a plurality of capacitor units associated with each phase and each capacitor unit is provided with a metal tank enclosing capacitor sections and having a pair of insulating bushing means on said tank provided with conductor means extending therethrough connected to said capacitor sections; the improvement comprising means associated with each phase for connecting one of said conductor means of all of said capacitor units associated with said phase to one phase conductor of said power system and the other said conductor means thereof to ground, whereby said capacitor bank is connected in Y to said power system and the neutral is grounded, a metallic framework supporting and electrically commoned with the tanks of the capacitor units of all three phases, and insulators for isolating said metal framework from ground, whereby an impulse on any phase conductor has a path to ground through the capacitance between said one conductor means and said tank of each capacitor unit connected to said phase conductor in series with the parallel arrangement of the capacitances of all of said units of said bank between said tank and said other conductor means and the impulse insulation level of said bank is increased.

5. In a shunt capacitor bank having a plurality of capacitor units each of which is provided with a metal tank enclosing capacitor sections and having a pair of insulating bushings on said tank each of which has conductor means extending therethrough connected to said capacitor sections, the improvement comprising means connected to one of said conductor means of all of said capacitor units for connecting said capacitor units in Y and for grounding the neutral thereof, a metallic framework supporting and electrically commoned with said tanks, and insulators for isolating said metallic framework from ground, whereby the capacitances between said one conductor means and said tank of all of said units are in parallel and said paralleled capacitances are in series with the capacitance between said tank and the other conductor means of each said unit to provide a path to ground for an impulse appearing on said other conductor means and the impulse insulation level of said capacitor bank is raised.

6. In combination with a three phase alternating current power line, three capacitors, means for connecting said three capacitors in Y to said power line, the neutral of said Y connected capacitors being grounded, each of said capacitors comprising a plurality of capacitor units connected in parallel, each of said units including a metallic housing having a pair of insulating bushings thereon, one of said bushings having a line conductor extending therethrough and the other of said bushings having a ground conductor extending therethrough, capacitance sections within said housing connected to said line and ground conductors, said line conductors of all of said units of each of said capacitors being connected to one phase of said power line and said ground conductor of all of said units being connected to said grounded neutral, means for electrically commoning the housings of all of said capacitor units, and insulator means for isolating said electrically commoned housings from ground.

7. A three phase Y capacitor bank having a grounded neutral for supplying reactive volt amperes to a three phase electric power system and having a capacitor in each phase connected between the phase conductor of said phase and said grounded neutral, each capacitor including a plurality of metallic housing means enclosing capacitor sections, two insulating bushings on each said metallic housing means, a line conductor extending through one of said insulating bushings and connected to said phase conductor and to said capacitor sections within said housing means and a ground conductor extending through the other of said bushings and connected to ground and to said capacitor sections within said housing means; a metallic framework supporting said metallic housing means of each of said capacitors and insulators for insulating said metallic framework from ground, whereby an impulse on a phase conductor has a path to ground through the capacitance between said line conductor and each said metallic housing means of said phase in series with the parallel capacitances between said metallic housing means and said ground conductor and the impulse insulation level of said capacitor bank is increased.

8. In combination with an alternating current power line, a capacitor bank comprising a plurality of capacitor units connected between said power line and ground, each of said units including a metallic housing, capacitor sections within said housing, a pair of insulating bushings on said housing, a line conductor extending through one of said insulating bushings and connected to said power line and also to said capacitor sections within said housing, a ground conductor extending through the other of said insulating bushings and being connected to ground and to said capacitor sections within said housing, a metallic framework supporting and electrically commoned with said housings of all of said capacitor units, and insulating means for isolating said framework from ground, whereby an impulse on said power line has a path to ground through the capacitance in each unit between said line conductor and said housing in series with the paralleled capacitances of all of said units between said housing and said ground conductor and the impulse insulation level of said capacitor bank is increased.

9. In combination with a three phase alternating current power line, three capacitors, means for connecting said capacitors in Y to said power line, the neutral of said Y-connected capacitors being connected to ground, metallic housing means for each of said capacitors, capacitor sections within said housing means, a pair of bushing means on each said housing means having conductor means extending therethrough connected to said capacitor sections within said housing means and one said conductor means being connected to one of the phases of said power line and the other said conductor means being connected to said neutral, three metallic supports each of which is electrically commoned with and supports said housing means of one of said capacitors, and three insulator means each of which isolates one of said metallic supports from ground and from the other supports, whereby a surge voltage on any phase of said power line has a path to ground through the capacitance between said conductor means connected to said phase and said housing means in series with the capacitance between said housing means and said conductor means connected to said neutral and the impulse insulation level of said capacitor bank is increased.

10. In combination with a three phase alternating current power line, a capacitor bank connected in Y to said power line and having a grounded neutral, said capacitor bank including at least two capacitor units in each phase connected in series between said grounded neutral and the corresponding phase conductor of said power line, each capacitor unit comprising a metallic tank, capacitor sections within said tank, a pair of insulating bushings on said tank, and a line conductor extending through one of said bushings and a ground conductor extending through the other of said bushings and both said conductors being connected to said capacitor sections within said tank; the line conductor of one of said two units in each phase being connected to the ground conductor of the second unit to connect said units in series and said ground conductor of said one unit and the line conductor of said second unit being connected between said phase conductor and said grounded neutral, three means each of which is associated with one of said phases for electrically commoning said metallic tanks of said capacitor units of said phase, and means for insulating the electrically commoned tanks of the capacitor units of each of said phases from ground.

11. In the combination defined by claim 10 wherein said means for commoning electrically interconnects said metallic tanks of said capacitor units of all three phases.

12. In the combination defined by claim 10 wherein the junction of said line conductor of said one unit and said ground conductor of said second unit in each phase is electrically connected to the electrically commoned metallic tanks of the capacitor units of said phase.

13. In combination with a three phase alternating current power line, a capacitor bank connected in Y to said power line and having a grounded neutral and including at least two capacitor units in each phase connected in series between said grounded neutral and the corresponding phase conductor of said power line, each capacitor unit including a metallic tank, capacitor sections within said tank, insulating bushing means on said tank, and conductor means extending through said bushing means and connected to said capacitor sections; three metallic support means each of which is associated with one of said phases for electrically commoning and supporting said metallic tanks of said capacitor units of said phase, and insulating means for isolating each of said metallic support means from ground, whereby an impulse on one of said phase conductors has a path to ground through the capacitance of one of said conductor means to said tank of one of said two capacitor units in said phase in series with the capacitance between the tank and one of said conductor means of the second unit and the impulse insulation level of said capacitor bank is increased.

14. In the combination defined by claim 13 wherein said bushing means on each of said capacitor units comprise a single insulating bushing and said two capacitor units of each phase are electrically connected by said support means.

15. In the combination defined by claim 13 wherein said insulating bushing means on each of said capacitor units comprises two insulating bushings and said conductor means comprises a conductor extending through each said bushing, one of said conductors on one of said two capacitor units in each phase is joined to a conductor on the second unit to connect said capacitor units in series, and the junction of said two conductors is electrically connected to the metallic support means of the corresponding phase.

16. In combination with an alternating current power line, a shunt capacitor bank comprising a plurality of metallic housing means, capacitor sections within each housing means, a pair of insulating bushings on each housing means, a conductor extending through each of said bushings and being connected to said capacitor sections within said housing means, the conductor extending through one of said bushings being connected to said power line and the conductor extending through the other bushing being connected to ground, means for and electrically commoning all of said metallic housing means, and means including insulators for isolating said electrically commoned metallic housing means from ground, whereby an impulse on said power line has a path to ground through the capacitance between each housing means and the conductor thereon connected to said power line in series with the parallel capacitances between all of said housing means and the conductor thereon connected to ground and the impulse insulation level of said capacitor bank is increased.

References Cited by the Examiner

FOREIGN PATENTS 560,606  7/1958  Canada.

OTHER REFERENCES

Article entitled, "Bank of Capacitors Reinforces 132–KV. Grid" by L. F. Ferri and C. S. Dayton, Electrical World, March 29, 1947, pp. 66–69.

MILTON O. HIRSHFIELD, *Primary Examiner.*

J. J. SWARTZ, *Assistant Examiner.*